(12) United States Patent
Tanaka et al.

(10) Patent No.: US 7,436,459 B2
(45) Date of Patent: Oct. 14, 2008

(54) DIGITAL BROADCAST RECEIVING APPARATUS AND METHOD FOR RECEIVING DIGITAL BROADCAST

(75) Inventors: Toshio Tanaka, Hyogo (JP); Shinichi Iwamoto, Hyogo (JP); Mutsuo Tanabe, Hyogo (JP); Sonoe Mori, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 538 days.

(21) Appl. No.: 11/077,037

(22) Filed: Mar. 11, 2005

(65) Prior Publication Data

US 2005/0212966 A1 Sep. 29, 2005

(30) Foreign Application Priority Data

Mar. 11, 2004 (JP) ............................ P2004-069764

(51) Int. Cl.
*H04N 5/50* (2006.01)
*H04N 5/44* (2006.01)

(52) U.S. Cl. .................. 348/570; 348/553; 348/559
(58) Field of Classification Search ............... 348/553, 348/559, 564, 570; 725/38; 386/68; 455/234.1
See application file for complete search history.

(56) References Cited

U.S. PATENT DOCUMENTS

| 5,745,185 | A | * | 4/1998 | Portron et al. ............... 348/513 |
| 5,758,271 | A | * | 5/1998 | Rich et al. ................. 455/234.1 |
| 5,818,441 | A | * | 10/1998 | Throckmorton et al. ...... 715/717 |
| 5,844,629 | A | * | 12/1998 | Murray et al. ............... 348/642 |
| 5,898,730 | A | * | 4/1999 | Hensley et al. ............... 375/224 |
| 6,052,155 | A | * | 4/2000 | Cherrick et al. .............. 348/565 |
| 6,580,452 | B1 | * | 6/2003 | Gangitano ................... 348/180 |
| 6,670,997 | B1 | * | 12/2003 | Nortrup ....................... 348/558 |
| 6,904,273 | B2 | * | 6/2005 | Steber et al. .............. 455/234.1 |
| 2001/0033625 | A1 | | 10/2001 | Ninomiya et al. |
| 2001/0037485 | A1 | * | 11/2001 | Zhang ......................... 714/790 |
| 2003/0063893 | A1 | * | 4/2003 | Read ............................ 386/46 |
| 2003/0093817 | A1 | * | 5/2003 | Lee .............................. 725/151 |
| 2003/0177497 | A1 | * | 9/2003 | Macrae et al. ................. 725/60 |
| 2003/0231866 | A1 | * | 12/2003 | Ritz et al. ...................... 386/68 |

FOREIGN PATENT DOCUMENTS

| JP | A 07-322241 | 12/1995 |
| JP | A 2001-285752 | 10/2001 |
| JP | A 2003-069915 | 3/2003 |

* cited by examiner

*Primary Examiner*—Victor R Kostak
(74) *Attorney, Agent, or Firm*—Oliff & Berridge, PLC

(57) ABSTRACT

A digital broadcast receiving apparatus for receiving a digital broadcast, includes a freeze determining section and a display control section. The freeze determining section determines whether or not a freeze process should be initiated on a basis of a receiving status of the digital broadcast. The freeze determining section also determines whether or not the free process being performed should be terminated on the basis of a receiving status of the digital broadcast. The display control section initiates the freeze process when the freeze determining section concludes that the freeze process should be initiated. The display control section terminates the freeze process being performed when the freeze determining section concludes that the freeze process being performed should be terminated. The freeze process includes displaying a freeze notification on a screen while changing the freeze notification so that a user recognizes the change of the freeze notification.

9 Claims, 9 Drawing Sheets

|  | PLOT | REAL TIME | MOVEMENT |
|---|---|---|---|
| SPORTS | ◎ | ◎ | LARGE |
| NEWS | ○ | ◎ | MIDDLE |
| DRAMA | ◎ | △ | MIDDLE |
| MOVIE | ◎ | △ | MIDDLE |
| VARIETY | ◎ | △ | MIDDLE |
| ANIME | ○ | △ | MIDDLE |
| NATURE/DOCUMENTARY | △ | △ | SMALL |
| TV SHOPPING | △ | △ | SMALL |

SHORT ↑
↓ LONG FREEZE TIME

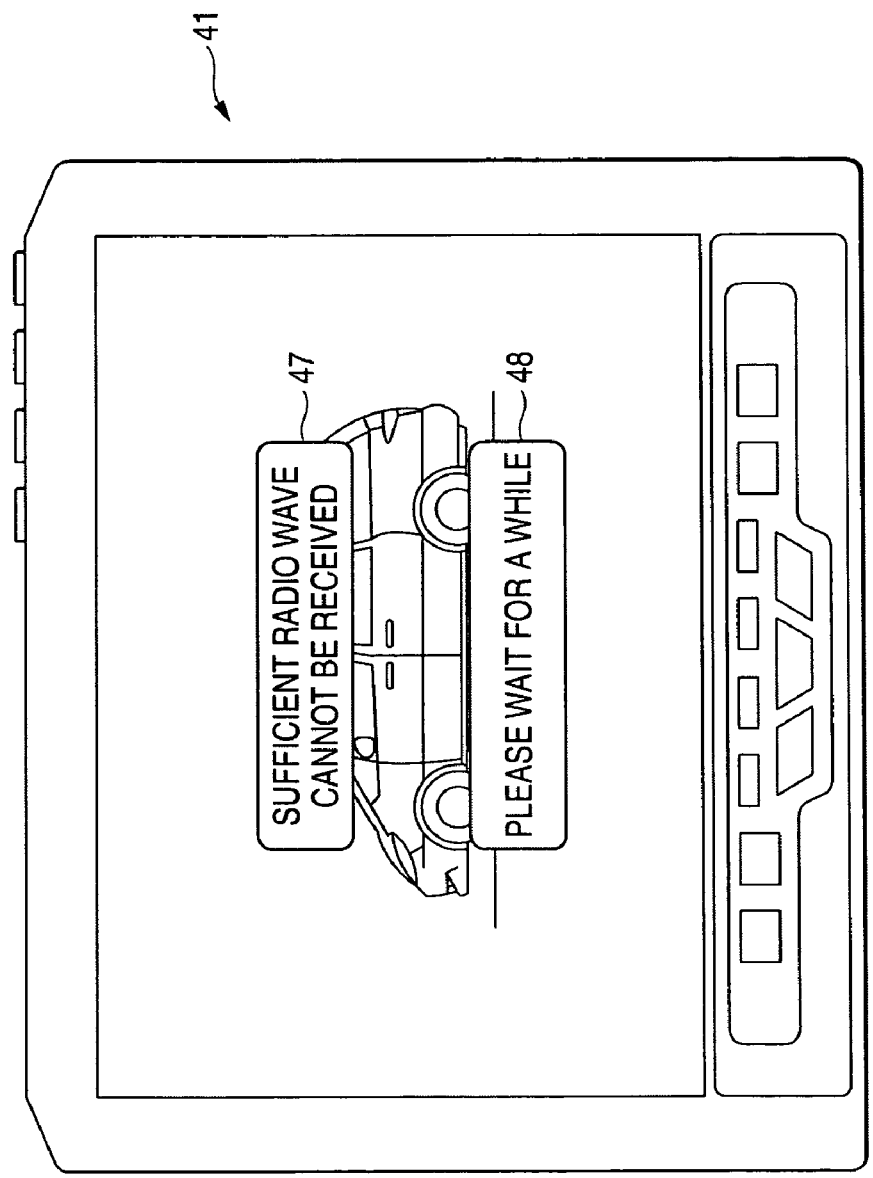

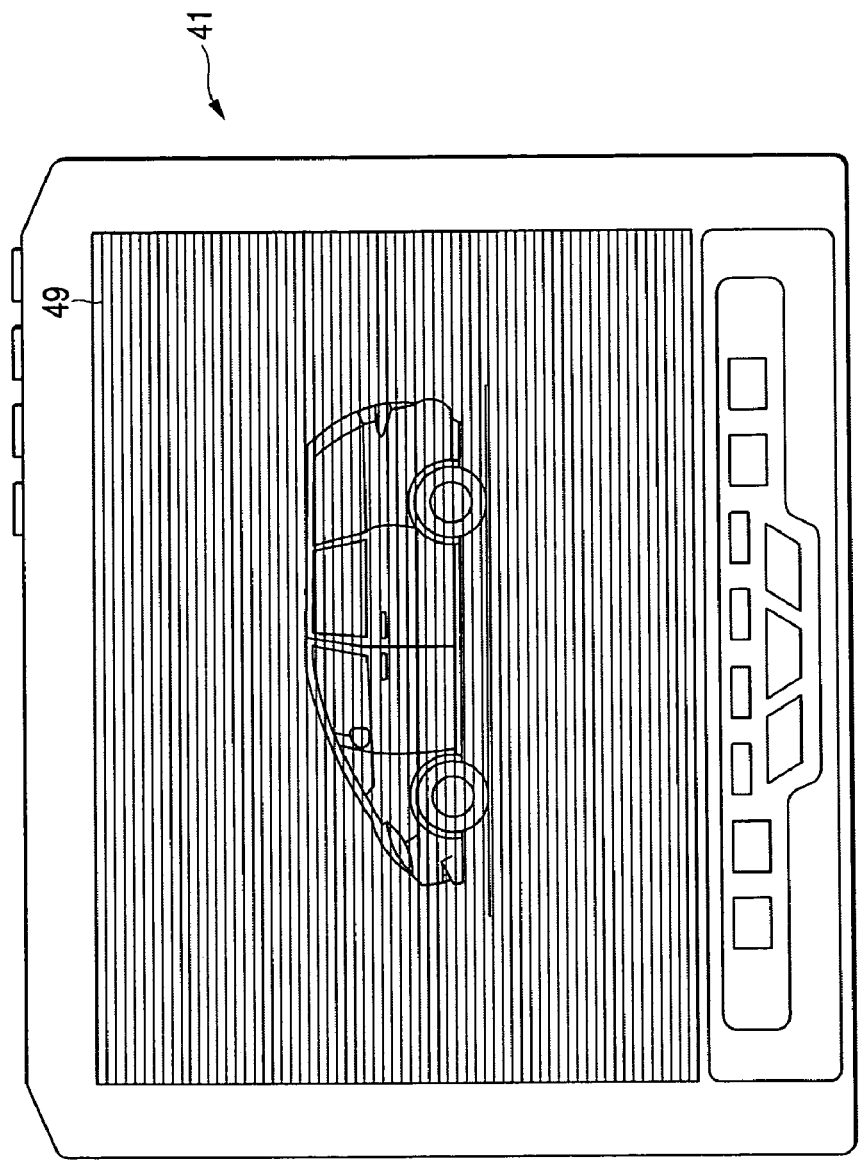

ed in the digital broadcast (see JP-A-2001-285752).

DIGITAL BROADCAST RECEIVING APPARATUS AND METHOD FOR RECEIVING DIGITAL BROADCAST

BACKGROUND OF THE INVENTION

1. Field of the Invention

This invention relates to a digital broadcast receiving apparatus for receiving a digital broadcast, and more particularly to a digital broadcast receiving apparatus, which is usable under a condition where a receiving state varies, e.g., one mounted on a moving body such as a motor vehicle.

2. Description of the Related Art

Recently, a digital television broadcast, which broadcasts a digitized video program, has become commercially practical in Japan. The digital broadcast has advantages in that enhanced image quality, multi-channeling and interactive communication can be achieved. Because of these advantages, the use of the digital broadcast has been widely spread. Namely, in addition to a BS digital broadcast, which has been conventionally carried out, a ground analog broadcast has been shifted in the digital broadcast (see JP-A-2001-285752).

SUMMARY OF THE INVENTION

Meanwhile, in the digital broadcast, contents of the broadcast are transmitted as TS packets, and a receiving apparatus decodes the TS packets to reconstruct images.

But if the radio wave receiving status is insufficient, the TS packets to be received may be missed or an error may occur in the TS packets to be received. In this case, the reconstructed image is incomplete, so that the reproduction is not properly executed.

To avoid this, the inventors manufactured a digital broadcast receiving apparatus in which when it is impossible to reproduce images normally, the reproducing is stopped; and when the receiving status recovers to a sufficient level, reproducing of images is restarted. However, in this digital broadcast receiving apparatus according to a related art, an image displayed at a time when the reproducing is stopped stands still on a screen.

As described above, since this process is performed for dealing with deterioration of the radio wave receiving status, the digital broadcast receiving apparatus itself is operating normally. However, in this case, since image displayed on the screen is standing still, a user cannot determine whether the receiving status has been deteriorated or the digital broadcast receiving apparatus operates abnormally.

In particular, in receiving of an analog broadcast, the deterioration of the receiving status appears as degradation of images displayed on the screen. Even when it is impossible to receive broadcast at all, noise is displayed on the screen. Since a user can recognize change of the noise displayed on the screen visually, standstill images displayed on the screen cause a user who is familiar with watching the analog broadcast to feel uncomfortable greatly. This leads to the user's concern that the digital broadcast receiving apparatus may operate abnormally. Further, if the freeze (standing still) starts in the middle of rewriting an image displayed on the screen, an image displayed on an upper side of the screen is different from that display on a lower side thereof. This makes a user further feel uncomfortable.

Thus, in receiving the digital broadcast, it has been significant problems to alleviate the user's uncomfortable feeling during freeze of an image displayed on the screen and to remove user's concern that the digital television receiving apparatus may operate abnormally.

Particularly, in the digital broadcast receiving apparatus mounted on a moving body such as an in-vehicle television, since the radio wave receiving status changes with movement of the moving body, it is important to solve such a problem.

The invention has been made to solve the problems described above, and provides a digital broadcast receiving apparatus, which can alleviate a user's uncomfortable feeling at a time of performing the freeze process and eliminate a user's concern that the digital television receiver 1 operates abnormally.

In order to solve the problem described above and attain the object, according to one embodiment of the invention, a digital broadcast receiving apparatus for receiving a digital broadcast, includes a freeze determining section and a display control section. The freeze determining section determines whether or not a freeze process should be initiated on a basis of a receiving status of the digital broadcast. The freeze determining section also determines whether or not the free process being performed should be terminated on the basis of a receiving status of the digital broadcast. The display control section initiates the freeze process when the freeze determining section concludes that the freeze process should be initiated. The display control section terminates the freeze process being performed when the freeze determining section concludes that the freeze process being performed should be terminated. The freeze process includes displaying a freeze notification on a screen while changing the freeze notification so that a user recognizes the change of the freeze notification.

With this configuration, the digital broadcast receiving apparatus can alleviate a user's uncomfortable feeling at a time of performing the freeze process and eliminate a user's concern that the digital television receiver 1 operates abnormally.

BRIEF DESCRIPTION OF THE DRAWINGS

FIG. 9 is a view showing a specific example of the freeze notification implemented by displaying a message.

FIG. 10 is a view showing a specific example of the freeze notification by means of displaying pseudo noise.

DETAILED DESCRIPTION OF THE PREFERRED EMBODIMENTS

Now referring to the attached drawings, an explanation will be given of an in-vehicle digital television receiver according to an embodiment of the invention. It should be noted that the invention is not limited to the in-vehicle digital television receiver, but may be applied to a digital broadcast receiving apparatus.

Embodiments

Figure 1:
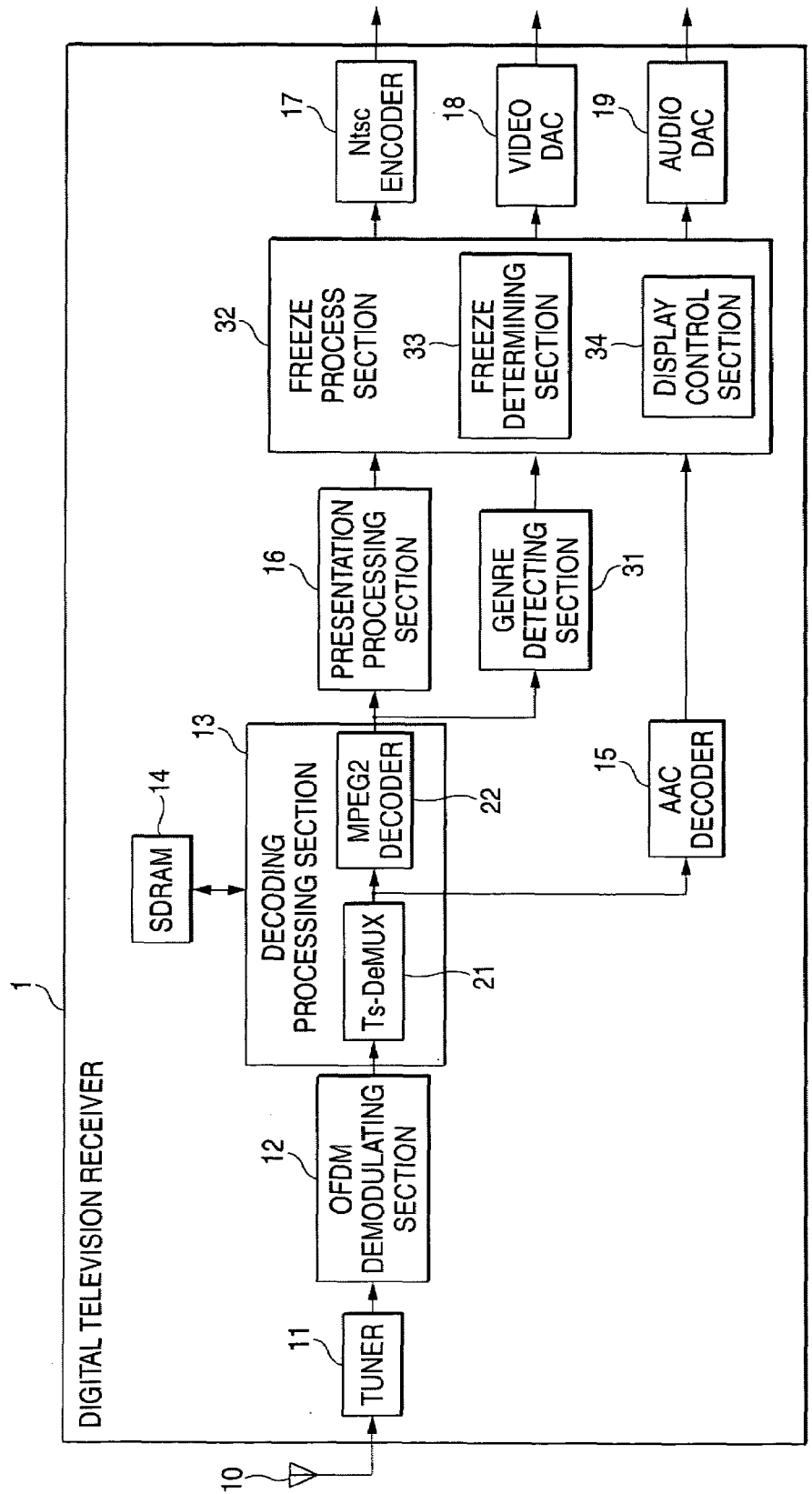
FIG. 1 is a schematic block diagram showing a general configuration of a digital television receiver according to an embodiment of the invention.

FIG. 1 is a schematic block diagram showing a general configuration of an in-vehicle digital television receiver 1 according to this embodiment. As shown in FIG. 1, the digital television receiver 1 includes an antenna 10, a tuner 11, an OFDM demodulating section 12, a decoding processing section 13, an SDRAM 14, an AAC decoder 15, a presentation processing section 16, a Ntsc encoder 17, a video DAC 18, an audio DAC 19, a genre detecting section 31 and a freeze process section 32.

The tuner 11 tunes signals at a specified frequency from radio wave received by the antenna 10, and outputs the tuned signals to the OFDM demodulating section 12.

In the digital television broadcast, the OFDM (Orthogonal Frequency Division Multiplex) is adopted as an encoding system. Therefore the OFDM demodulating section 12 applies the OFDM demodulating to the signal tuned by the tuner 11 to extract TS packets and outputs the TS packets to the decoding processing section 13.

The decoding processing section 13 includes a TS-DeMUX 21 and an MPEG2 decoder 22. The TS-DeMUX 21 executes filtering to select a necessary packet from the TS packets output from the OFDM demodulating section 12.

Further if the TS packet extracted is audio encoded data, the TS-DeMUX 21 outputs the TS packet to the AAC decoder 15. If the TS packet extracted is image encoded data, the TS-DeMUX 21 outputs the TS packet to the MPEG2 decoder 22.

In the digital television broadcast, images are encoded by the MPEG (Moving Picture Experts Group) 2 standard and audio is encoded by the AAC (Advanced Audio Coding) standard. Thus, the MPEG2 decoder 22 decodes image data according to the MPEG2 standard, and the AAC decoder 15 decodes audio data according to the AAC standard.

The presentation processing section 16 handles data broadcasting. If the received channel involves the data broadcasting, the presentation processing section 16 reconstructs content of the image to be output into an image corresponding to the data broadcasting.

The Ntsc encoder 17 encodes the image data in an Ntsc (National Television Standards Committee) format, which is in turn externally output. On the other hand, the video DAC 18 converts the image data from a digital signal into an analog signal to be output. An output from the video DAC 18 will be used in a display (not shown) formed integrally to the digital television receiver 1. Further, the audio DAC 19 converts the audio data from a digital signal into an analog signal to be output.

The SDRAM (Synchronous DRAM) 14 functions as a storage unit to temporarily store the image data decoded by the MPEG 2 decoder 22.

When proper reproduction cannot be done, for example because the receiving status has been deteriorated, a digital television receiver according to a relevant art stops updating of the image data to be stored in the SDRAM 14, thereby realizing the freeze process. Thus, the image output from the Ntsc encoder 17 and the video DAC 18 of the digital television receiver according to the relevant art are the image data stored in the SDRAM 14, which stops the updating.

On the other hand, in the digital television receiver 1 according to this embodiment, the SDRAM 14 updates the image data irrespectively of whether the freeze process is being performed. During a period where the freeze process is performed, the freeze process section 32 controls the screen.

The freeze process section 32 includes a freeze determining section 33 and a display control section 34. The freeze process section 32 determines initiating and terminating the freeze process on the basis of the receiving status. Specifically, the freeze determining section 33 determines whether or not the freeze process should be initiated on the basis of the receiving status of the digital broadcast, and determines whether or not the free process being performed should be terminated on the basis of the receiving status of the digital broadcast. When the freeze determining section 33 concludes that the freeze process should be initiated, the display control section 34 controls the image output to the Ntsc encoder 17 and the video DAC 18, and also controls the voice output to the audio DAC 19.

Next a further explanation will be given of the determining process by the freeze process section 33. Specifically, the freeze determining section 33 determines initiating and terminating the freeze process on the basis of number of TS packets containing errors.

Figure 2:
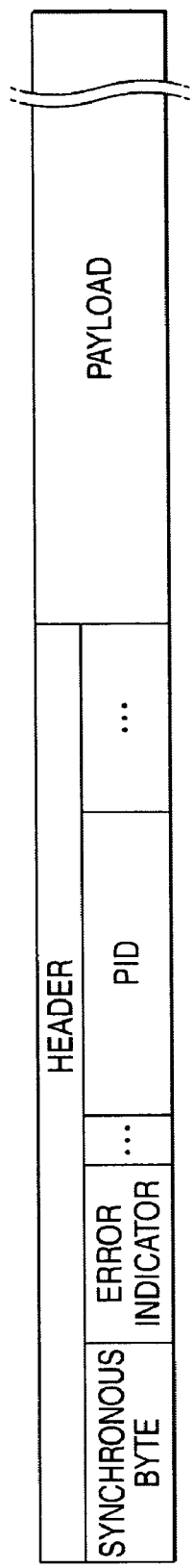
FIG. 2 is a view for explaining a construction of a TS packet.

As shown in FIG. 2, the TS packet includes a header and a payload (or adaptation field). The payload stores the image, audio, etc. The header contains a synchronous byte, which is a code indicating the beginning of the TS packet, an PID (packet identifier) used for identifying the TS packet, an error indicator indicating as to whether or not a bit error is contained in the TS packet.

This error indicator is a one-bit indicator, which indicates the value of "0" if the TS packet contains no bit error and indicates the value of "1" if the TS packet contains a bit error. The freeze determining section 33 counts number of the TS packets having the error indicator of "1" and compares the counted number with a predetermined threshold value, to thereby determine initiating and terminating the freeze process.

Figures 3, 4:
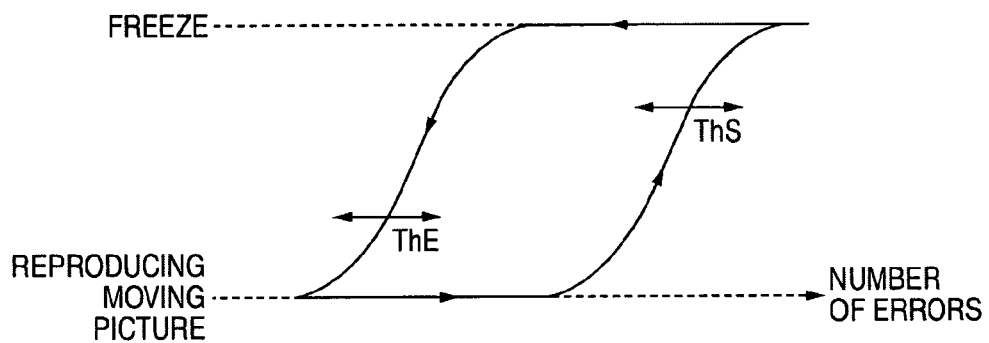
FIG. 3 is a view for explaining transition between a freeze state and a moving-picture reproducing state.
FIG. 4 is a view for explaining a relationship between content of broadcast and a freeze process.

Now, a terminating threshold value ThE, which is used to determine as to whether or not the freeze process being performed should be terminated, is lower than an initiating threshold value ThS, which is used to determine as to whether or not the freeze process should be initiated. Thus, as shown in FIG. 3, the freeze state and the moving picture reproducing state transit in a hysteresis manner. For this reason, repetitive occurrence of the freeze state in a short time can be avoided thereby to realize stabilized reproduction.

In this way, extent, to which if the receiving status has been deteriorated, the freeze process is initiated, depends on the initiating threshold value ThS. Also, extent, to which if the receiving status has recovered, the freeze process being produced is terminated, depends on the terminating threshold value ThE.

Meanwhile, extent to which if the receiving status has been deteriorated, the freeze process should be initiated; and extent to which if the receiving status has recovered, the freeze process being produced should terminated, depend on content of the received broadcast (received program). For example, in a case where a received program is one with plot such as a drama program, or in a case where a received program is one which a user wants to watch it in real time, such as a sports program, it is preferable that even if the reproducing status has been deteriorated to a certain extent, the digital television receiver 1 does not transit to the freeze process, but keeps reproducing moving pictures. In this case, it is also preferable that the digital television receiver 1 restarts reproducing the moving pictures as soon as possible after the freeze process is initiated, in order to shorten a freeze time. On the other hand, in a case where the received program is one which a user accepts not to watch it in real time, such as a documentary program, or in a case where the received program is one requiring high image quality, it is preferable that if the receiving status has been deteriorated relatively lightly, the digital broadcast receiver 1 transits to the freeze process. In this case, it is also preferable that the digital broadcast receiver 1 restarts reproducing the moving pictures after the receiving status sufficiently recovers.

Thus, in the digital television receiver 1, the genre detecting section 31 detects genre of the received broadcast (received program), and the freeze determining section 33 changes the initiating threshold value ThS and the terminating threshold value ThE on the basis of the genre thus detected.

Specifically, as shown in FIG. 4, since a user is likely to want to watch a sports program in real time and news program is likely to have a plot, the terminating threshold values ThE therefor are set to be large, thereby shortening the freeze time. On the other hand, since a user accepts not to watch a document program in real time, the terminating threshold value ThE for the document program is set to be small, thereby lengthening the freeze time.

Further, if the initiating threshold value ThS is set to be small, a process, which gives priority to image quality, can be realized in which when the receiving status has been deteriorated to a relatively low degree, the digital television receiver 1 proceeds to the freeze process. If the initiating threshold value ThS is set to be large, a process, which gives priority to real time reproducing can be realized in which even when the receiving status has been significantly deteriorated, the digital television receiver 1 continues to reproduce moving pictures.

The genre detecting section 31 may specify genre of a received program by reading out EPC (electronic program guide) of digital television data broadcasting to make the detecting. Alternatively, the genre detecting section 31 may specify genre of a received program by detecting an amount of movement in images output from the MEP2 decoder 22 and specifying the genre based on this detected amount of movement.

Figure 5:
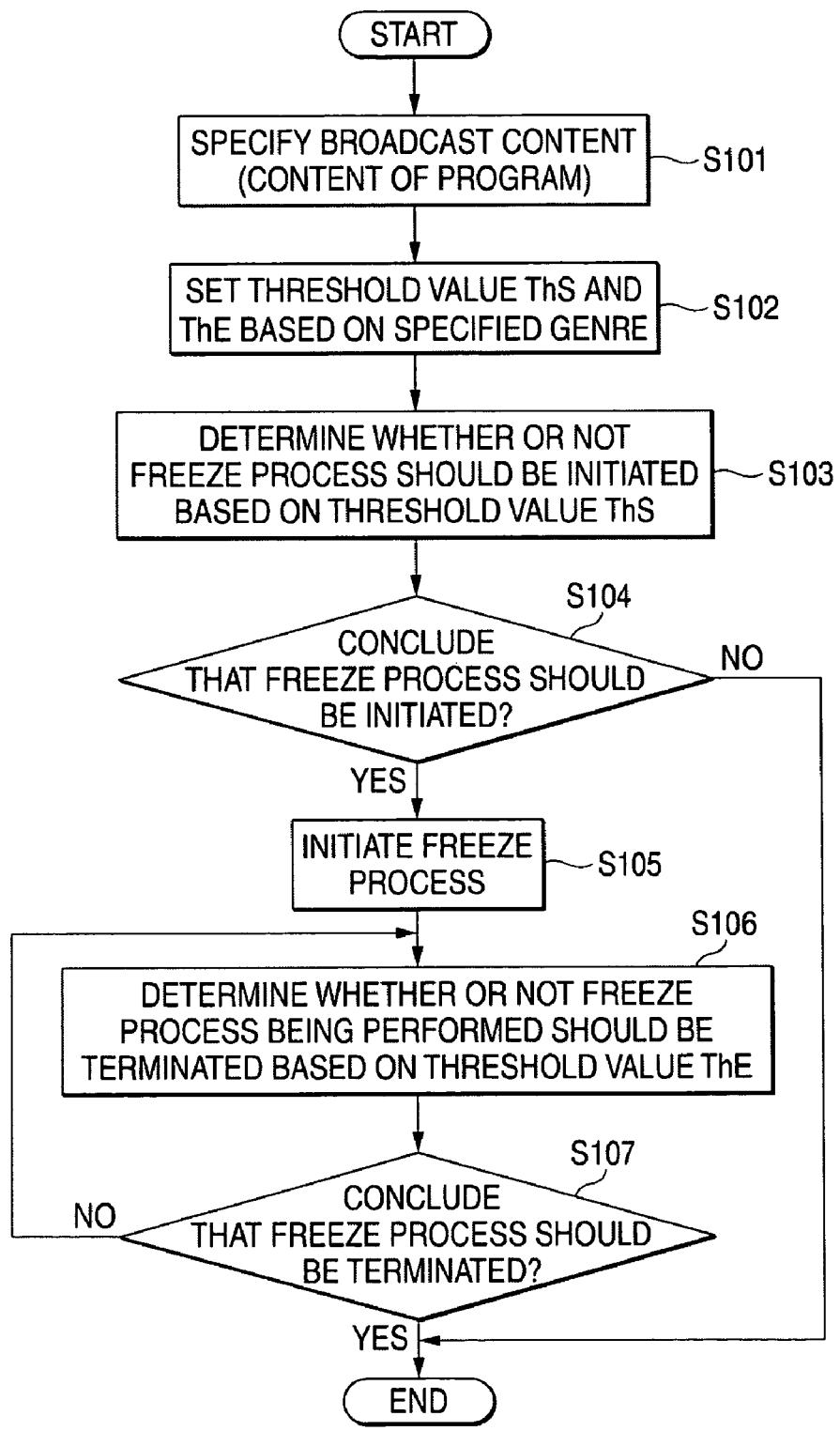
FIG. 5 is a flowchart for explaining a processing operation performed by a freeze determining section 33 shown in FIG. 1.

Next an explanation will be given of a processing operation of the freeze determining section 33. FIG. 5 is a flowchart for explaining the processing operation of the freeze determining section 33, which will be repeated in a state where the digital television receiver 1 is receiving the digital broadcast.

First, the freeze determining section 33 specifies the genre of the broadcast contents (content of a received program) on the basis of the output from the genre detecting section 31 (step S101), and sets the initiating threshold value ThS and the terminating threshold value ThE on the basis of the genre thus specified (step S102).

Then, the freeze determining section 33 compares the initiating threshold value ThS thus set with number of error packets, to determine as to whether or not the freeze process should be initiated (step S103). Thus if the freeze determining section 33 concludes that the freeze process should be initiated (step S104, yes), the freeze determining section 33 causes the display control section 34 to initiate the freeze process (step S105). Details of the freeze process will be described later.

Then, the freeze determining section 33 compares the terminating threshold value ThE with the number of the error packets, to determine as to whether or not the freeze process being performed should be terminated (step S106). If the freeze determining section 33 concludes that the freeze process being performed should not be terminated (step S107, No), the freeze determining section 33 causes the display control section 34 to continue the freeze process, and returns to steps S106. That is, the freeze determining section 33 determines as to whether or not the freeze process being performed should be terminated, again.

On the other hand, if the freeze determining section 33 concludes that the freeze process being performed should be terminated (step S107, Yes), the freeze determining section 33 causes the display control section 34 to terminate the freeze process. Then, the processing operation of the freeze determining section 33 is terminated. Likewise, if the freeze determining section 33 concludes that the freeze process should not be initiated (step S104, No), the processing operation of the freeze determining section 33 is terminated. Incidentally, since the flow of the processing operation of the freeze determining section 33 is loop-controlled as described above, if the digital television receiver 1 continues to receive the digital broadcast after the processing operation has been terminated, the processing operation is started again from step S101.

Next, an explanation will be given of a screen control, which is performed by the display control section during the freeze process. When the freeze determining section 33 instructs the screen control section 34 to perform the freeze process, the display control section 34 displays a freeze notification on the screen while changing the freeze notification so that a user recognizes the change of the freeze notification.

Therefore, the display content changes, even while reproducing of the received digital broadcast is stopped as a freeze process. Accordingly, a user can see that the digital television receiver 1 itself is operating normally and that the reason why a normal image is not displayed is the deterioration of the radio wave receiving status.

Specifically, the freeze process may include, for example, forcibly updating the screen with an image stored in the SDRAM 14 irrespectively of whether the normal image has been obtained, or causing an image (screen) to stand still and displaying an additional display while changing this additional display.

Figure 6:
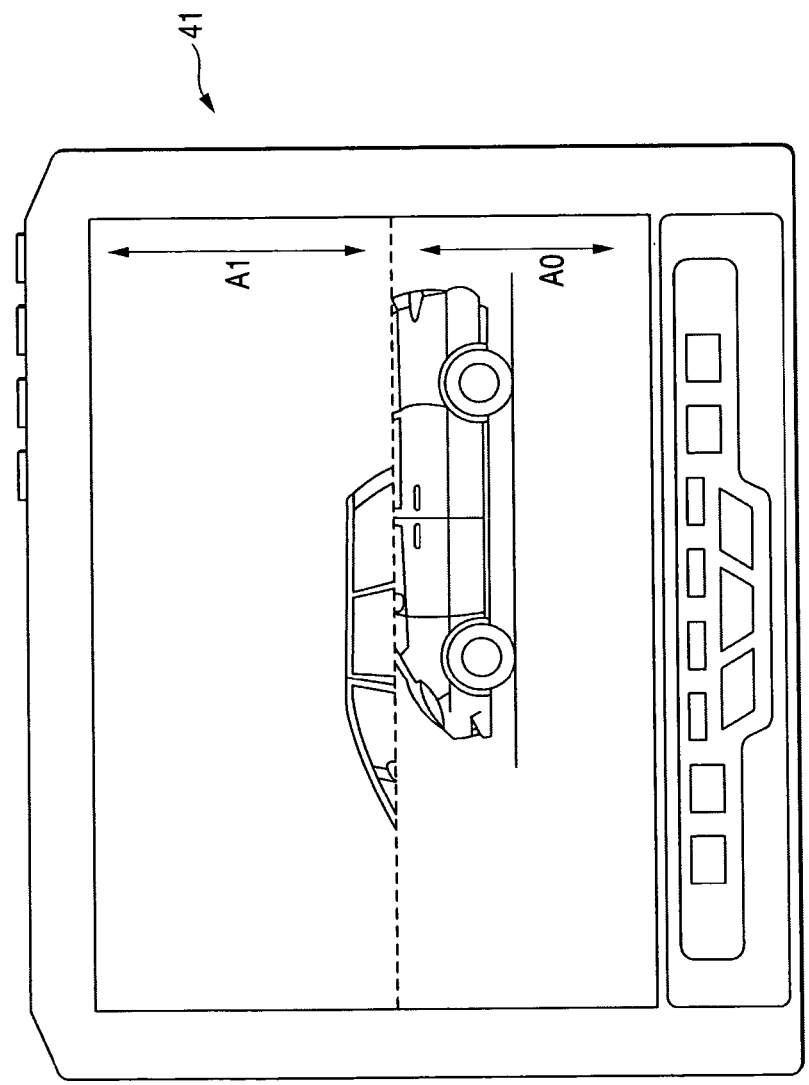
FIG. 6 is a view for explaining unbalance on a screen 41 in the freeze process.

Meanwhile, in the case where an image is caused to stand still, if it stands still on the way of rewriting the screen as shown in FIG. 6, different images will be displayed on upper and lower parts of the screen. This makes the user feel uncomfortable. Specifically, in FIG. 6, a new image A1 is being displayed on the upper part of the screen 41 whereas previous image A0 is being displayed on the lower part of the screen 41, resulting in that the images are unbalanced vertically.

In order to prevent the occurrence of the uncomfortable feeling due to the unbalancing of the image, the display control section 34 may update displayed image only when received video signals reach a predetermined amount corresponding to one screen.

Figure 7:
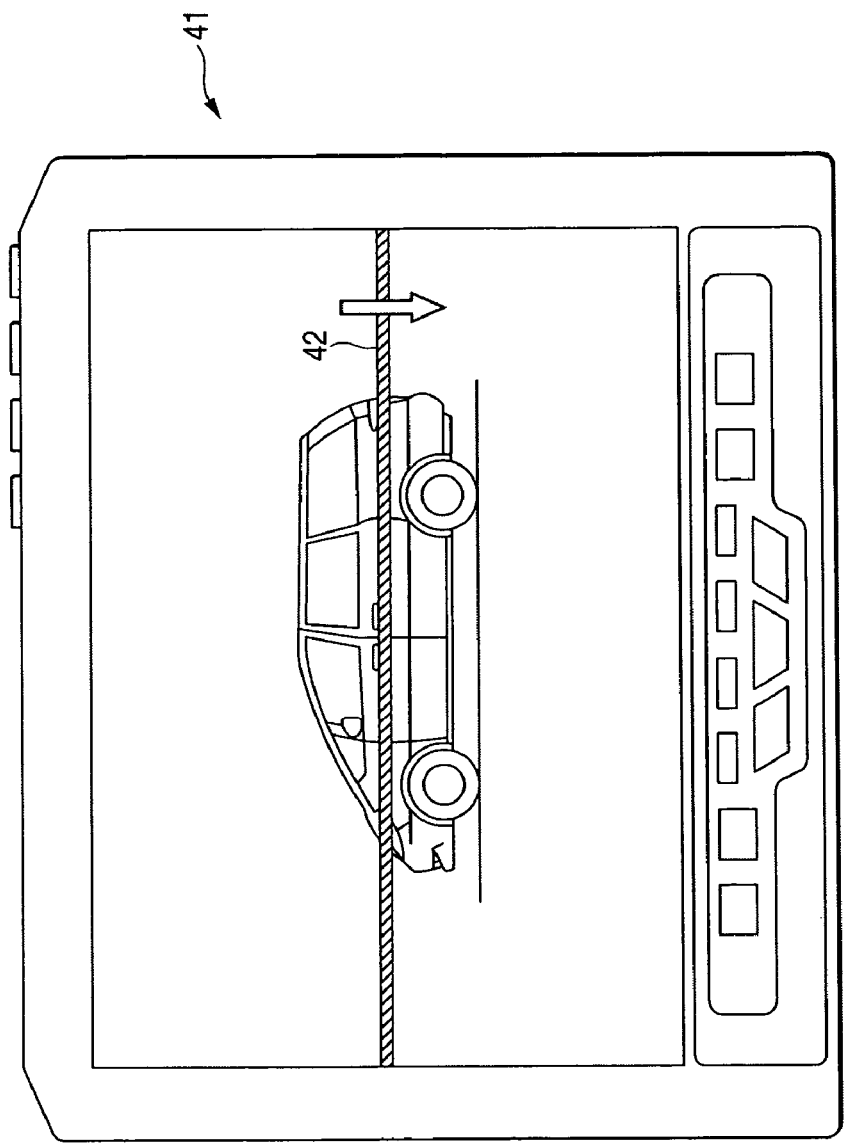
FIG. 7 is a view showing a specific example of a freeze notification implemented by displaying a pseudo updating line.

An explanation will be given of specific examples of the additional display used for a freeze notification. In FIG. 7, a pseudo updating line 42 is displayed on a screen to realize the freeze notification. Specifically, the display control section 34 displays the pseudo updating line 42, which has a width visually recognizable by a user, on the screen 41, and moves the pseudo updating line 42 at a speed visually recognizable by the user.

The display control section 34 may repeatedly display and move the pseudo updating line 42 during a period where the freeze process is performed, irrespectively of whether or not updating of image is performed. Further, it is preferable that the display control section 34 moves the pseudo updating line 42 from the upper part of the screen 41 to the lower part thereof.

Figure 8:
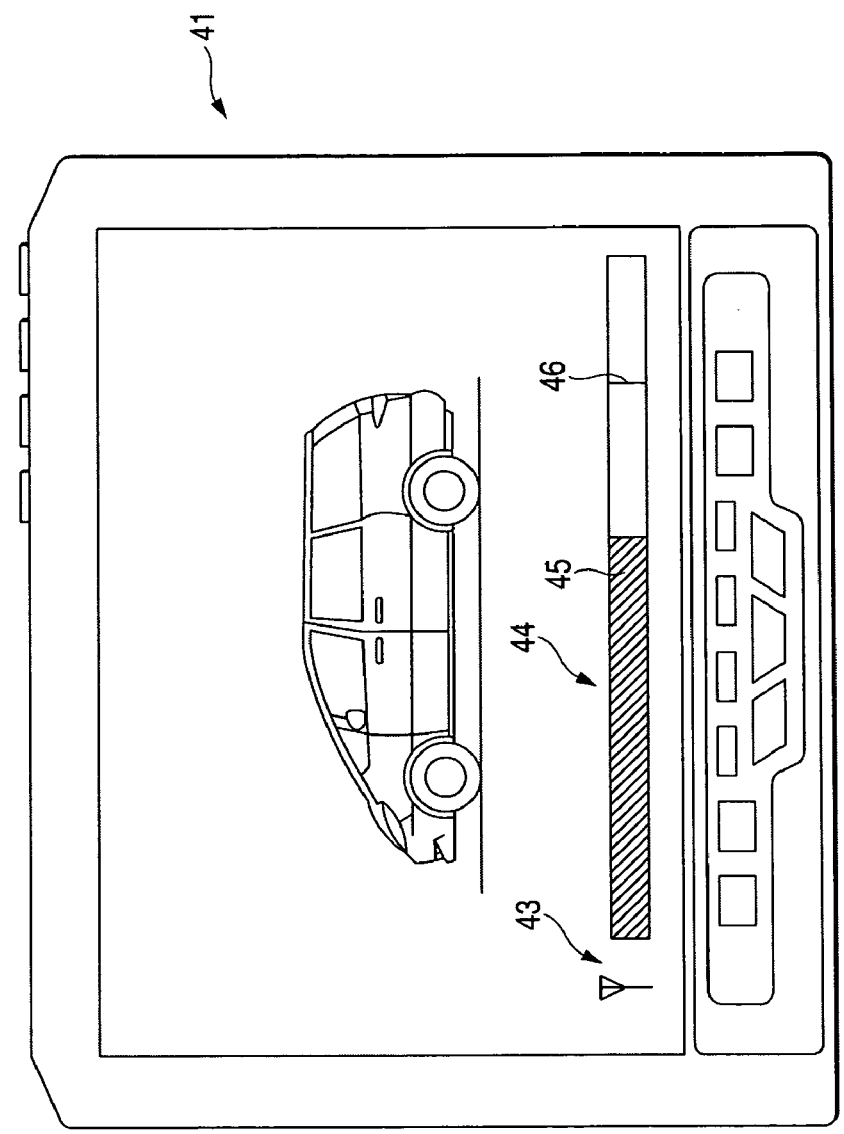
FIG. 8 is a view showing a specific example of the freeze notification implemented by displaying a radio wave receiving status.

Alternatively, as shown in FIG. 8, the display control section 34 may realize the freeze notification by displaying a receiving status of radio wave. Specifically, the display control section 34 displays an antenna mark 43 and a radio wave status indicator 44 on the screen 41.

The radio wave status indicator 44 has a receiving status bar 45 and a terminating threshold value display 46. The receiving status bar 45 shows change in the radio wave receiving status, which changes at a speed visually recognizable by the user.

Through such a display, a user can see that standing-still of image is caused due to the deterioration of the receiving status, and also to what degree the receiving status has been deteriorated and how long does it take to resume reproducing of the moving pictures.

Further, as shown in FIG. 9, the display control section 34 may realize the freeze notification by displaying a message of characters or others. In FIG. 9, the display control section 34 displays two message boxes 47 and 48 on the screen 41; the message "sufficient radio wave cannot be received" is displayed on the massage box 47 and the message "please wait for a while" is displayed on the message box 48.

With regard to the displaying of the messages, it is preferable that a user can see that the digital television receiver 1 is operating normally, by changing at least one of contents of the message, a display position of the message, rightness of the message and a color of the message so that the user can recognize the change of the message (i.e. the freeze notification).

Further, as shown in FIG. 10, the display control section 34 may realize the freeze notification by superposing a pseudo noise on the displayed image. In receiving the digital broadcast, the deterioration of the receiving status leads to the standing-still of the image, whereas in receiving the analog broadcast, the deterioration of the receiving status leads to degradation of image quality such as superposition of noise on the displayed image.

The display control section 34 superposes on the displayed image of the digital broadcast the pseudo noise, which is similar to a noise being displayed when the receiving status deteriorates in receiving the analog broadcast. Therefore, it is possible to notify the deterioration of the receiving status to a user who is familiar to watching the analog broadcast, without uncomfortable feeling.

By the way, if reproducing of the images is stopped by the freeze process, reproducing of the voice may be either stopped or continued. For example, in the broadcast such a relay broadcasting of sports, which a user wants to watch in real time, it is preferable that reproducing of the voice is continued even with the image standing still.

On the other hand, in the movie or drama, which a user accepts not to watch in real time and which requires coincidence between the voice and image, it is preferable that reproducing of the voice is stopped/resumed concurrently with that of the moving pictures.

Accordingly, the display control section 34 selects, in the freeze process, whether reproducing of the voice output from the AAC decoder 15 is stopped or continued on the basis of the genre specified by the genre detecting section 31.

As described above, the digital television receiver 1 according to this embodiment changes displayed content during a period in which the freeze process is performed, so that a user can see that deterioration of the receiving status causes standstill of image without uncomfortable feeling. Thereby, the digital television receiver 1 can eliminate a user's concern that the digital television receiver 1 operates abnormally.

In addition, the digital television receiver 1 according to this invention specifies content of received broadcast by means of the genre detecting section 31. Therefore, the digital television receiver 1 can initiate and terminate the freeze process appropriately in accordance with the content of the broadcast.

As described above, the digital broadcast receiving apparatus according to this invention is useful for the freeze control executed for dealing with e.g. deterioration of the radio wave receiving status, and particularly useful for the freeze control when the receiving status violently changes as in the digital television receiver for a moving body.

What is claimed is:

1. A digital broadcast receiving apparatus for receiving a digital broadcast, the digital broadcast receiving apparatus comprising:
    a content specifying section that specifies content of the received digital broadcast;
    a freeze determining section that determines whether or not a freeze process should be initiated by comparing error information contained in the received digital broadcast with a first threshold level, changes the first threshold level on a basis of the content specified by the content specifying section, and determines whether or not the freeze process being performed should be terminated on a basis of a receiving status of the digital broadcast; and
    a display control section that initiates the freeze process when the freeze determining section concludes that the freeze process should be initiated and terminates the freeze process being performed when the freeze determining section concludes that the freeze process being performed should be terminated;
    wherein the freeze process includes displaying a freeze notification on a screen while changing the freeze notification so that a user recognizes the change of the freeze notification.

2. The apparatus according to claim 1, wherein:
    the display control section displays as the freeze notification, a message indicating that the freeze process is being performed by means of at least one of characters and a figure; and
    the display control section changes at least one of contents of the message, a display position of the message, brightness of the message, and a color of the message so that the user recognizes the change of the at least one of contents of the message, a display position of the message, brightness of the message, and a color of the message.

3. The apparatus according to claim 1, wherein:
    the display control section displays a pseudo noise display as the freeze notification; and
    the display control section changes the pseudo noise display so that the user recognizes the change of the pseudo noise display.

4. The apparatus according to claim 1, wherein:
    the display control section displays the receiving status of the digital broadcast as the freeze notification; and
    the display control section changes the receiving status of the digital broadcast so that the user recognizes the change of the receiving status of the digital broadcast.

5. The apparatus according to claim 1, wherein the display control section forcibly updates a received image as the displaying of the freeze notification.

6. The apparatus according to claim 5, wherein when the display control section detects that video signals, which have been received after the freeze determining section concludes that the freeze process should be initiated, reach a predetermined amount corresponding to one screen, the display control section forcibly updates the received image.

7. A digital broadcast receiving apparatus for receiving a digital broadcast, the digital broadcast receiving apparatus comprising:

a freeze determining section that determines whether or not a freeze process should be initiated by comparing error information contained in the received digital broadcast with a first threshold level, and determines whether or not the freeze process being performed should be terminated on a basis of a receiving status of the digital broadcast by comparing the error information contained in the received digital broadcast with a second threshold level, wherein the first threshold level is larger than the second threshold level; and a display control section that initiates the freeze process when the freeze determining section concludes that the freeze process should be initiated and terminates the freeze process being performed when the freeze determining section concludes that the freeze process being performed should be terminated;

wherein the freeze process includes displaying a freeze notification on a screen while changing the freeze notification so that a user recognizes the change of the freeze notification.

8. The apparatus according to claim 1, wherein:

the freeze determining section compares error information contained in the received digital broadcast with a second threshold level to determine whether or not the freeze process being performed should be terminated; and the freeze determining section changes the second threshold level on a basis of the content specified by the content specifying section.

9. A method for receiving a digital broadcast, the method comprising:

specifying content of the received digital broadcast;

determining whether or not a freeze process should be initiated by comparing error information contained in the received digital broadcast with a first threshold level;

changing the first threshold level on a basis of the specified content of the received digital broadcast;

when the freeze process is being performed, determining whether or not the freeze process being performed should be terminated on a basis of a receiving status of the digital broadcast;

starting the freeze process when it is determined that the freeze process should be initiated;

terminating the freeze process being performed when it is determined that the freeze process being performed should be terminated; and displaying a freeze notification on a screen while changing the freeze notification so that a user recognizes the change of the freeze notification, during a period in which the freeze process is being performed.

* * * * *